United States Patent Office 2,969,335
Patented Jan. 24, 1961

2,969,335

REACTION PRODUCTS OF POLYESTERS AND PRIMARY AMINES

John Kenson Simons, Norristown, Pa., assignor to Quaker Chemical Products Corporation, Conshohocken, Pa., a corporation of Pennsylvania No Drawing. Filed June 25, 1957, Ser. No. 667,986

6 Claims. (Cl. 260—22)

This invention relates to the manufacture of novel resinous materials containing a plurality of secondary amine groups. One object of the invention is to provide resinous products which may be used in aqueous solutions as water-soluble salts. A further object is to provide resins with specially useful surface-active properties. An additional object is to prepare polyester resins by the relatively low temperature addition of amines to unsaturated polyesters.

The products of this invention are made by the interaction of a polyester resin obtained from the esterification of an alpha-beta-unsaturated dicarboxylic acid and a glycol, and a primary amine. The fundamental features of this reaction are illustrated by the following scheme:

A. Formation of unsaturated polyester:

XHOOC·U·COOH + YHO—G—OH → HOOC—U —CO[O—GOOC—U—CO]$_n$O—G—OH + 2$n$H$_2$O where X and Y are integers representing the molecules of acid and glycol reacted. The value of Y lies between $$\frac{X}{2} \text{ and } 2X$$

and $$n = \frac{X+Y}{2} - 1$$

B. Addition of amine to unsaturated polyester to yield a product with a plurality of secondary amine groups:

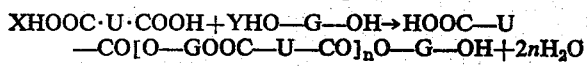

where $$n = \frac{X+Y}{2} - 1 \text{ and } Z \leq n+1$$

Polyesters useful in the reaction illustrated above comprise glycol esters of an "ene dioic" acid of the formula HOOC—U—COOH where U is a divalent radical selected from the group:

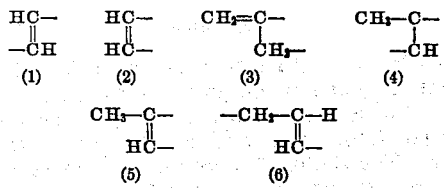

These formulae represent the following acids: (1) fumaric, (2) maleic, (3) itaconic, (4) mesaconic, (5) citraconic and (6) glutaconic acid. Suitable reactive substituted unsaturated dicarboxylic acids, wherein at least one hydrogen is replaced by a halogen or hydroxyl, alkyl, carboxyl group, may be used in preparing these polyesters. Such compounds for example include mono-chlormaleic acid, monochlorcitraconic acid, methyl, ethyl, pentyl, dodecyl maleic acids and the like, aconitic acid, hydroxy-maleic acid and their analogs and homologs.

The glycols which may be used to form esters of the acids listed above are represented by the formula HO—G—OH where —G— is a divalent radical selected from the group consisting of 1,2-; 1,3-; 1,4-; 1,5-; 1,6-alkylene radicals containing from 2 to 6 carbon atoms and polyoxyethylene and polyoxypropylene radicals containing 1 to 5 oxygen atoms.

Examples of glycols falling in these classes are ethylene glycol, propylene glycol, propanediol-1,3, butylene glycols, neopentyl glycol, butanediol-1,4, pentanediol-1,5, diethylene glycol, triethylene glycol, tetraethylene glycol, hexaethylene glycol, dipropylene glycol and hexane diol-1,6.

Modified polyesters derived from mixtures of an unsaturated dicarboxylic acid with saturated dicarboxylic acids such as phthalic, sebacic, succinic and adipic acid may be used; and mixtures of glycols may also be employed. Further modifications are possible by making use of higher polyhydric alcohols in admixture with the glycols. Polyhydric alcohols such as trimethylol ethane, trimethylol propane, hexamethylol benzene, and glycerine have utility for this purpose. For example a polyester can be used which is obtained by esterification of a mixture of 0.8 mole fumaric acid, 0.2 mole phthalic and 0.55 mole diethylene glycol and 0.55 mole propylene glycol. Another example of a polyester which can be used is one formed by the interaction of 0.9 mole maleic anhydride, 0.1 mole adipic acid, 0.5 mole ethylene glycol, 0.45 mole dipropylene glycol and 0.06 mole trimethylol propane.

The polyesters used herein are prepared by methods well known in the art. The acid or its anhydride (or mixtures thereof) are reacted with the glycol or mixtures of glycols usually in an oxygen-free atmosphere and under conditions such that water of condensation is removed. This may be accomplished by ordinary distillation followed (or accompanied) by gas sparging or distillation in the presence of an azeotroping solvent or by combinations of such processes.

To prevent gelation and/or thickening of the polyester during manufacture, it is important to control temperature below values in the neighborhood of 240° C. Under some conditions it is advisable to add to the esterification mixture a polymerization inhibitor, e.g. hydroquinone.

Such polyesters may be of a wide range of molecular weight. They may have been prepared with excess acid or glycol so that their acid numbers may vary over a wide range. They may be micro crystalline as in the case of polyethylene fumarate or they may be rigid solids at room temperature as in the case of polyesters containing combined phthalic acid. They may be liquids with varying viscosities depending on the nature of the glycol.

The amines which are reacted with the polyesters may contain aliphatic, aromatic, cycloaliphatic or heterocyclic groups. They may be described as mono primary amines of the formula RNH$_2$ where R is a monovalent radical selected from those obtained by removal of a hydrogen atom attached to carbon from an aliphatic hydrocarbon, an aromatic hydrocarbon, a cycloaliphatic hydrocarbon, an alcohol, an alkyl furan and an alkyl imidazoline. For example, ethyl amine, butyl amne, amyl amine, cyclohexyl amine, aniline, benzyl amine, toluidines, furfuryl amine (i.e. 2-aminomethyl furan), ethanolamine, isopropanolamine, polyglycol amines such as

HOCH$_2$CH$_2$OCH$_2$CH$_2$NH$_2$ and HOCH$_2$CH$_2$(OCH$_2$CH$_2$)$_2$NH$_2$, hydroxyalkoxyalkylamines, e.g. $H_2NCH_2CH_2CH_2OCH_2CH_2OH$ and the aminoethyl alkyl imidazolines are representative of these classes of amines. The amines used need not be of extreme purity as is illustrated in the case of the aminoethyl alkyl imidazolines. These materials are prepared by the condensation of fatty acids with polyalkylene polyamines such as diethylene triamine, triethylene tetramine and tetraethylene pentamine. Polypropylene polyamines and higher polyalkylene polyamines may also be employed. Useful acids are stearic, lauric, oleic, ricinoleic, octanoic or commercial mixtures thereof. Closely related derivative acids such as hydroxy stearic, or dihydroxy stearic are also useful. The interaction of these amines and acids is not a clear cut reaction and varying proportions of amides or salts may be contained in the product.

The reaction between the polyester and the amine may be carried out with widely differing molar ratios of amine to polyester. Since each C=C double bond in the polyester may react with one molecular equivalent of amine it is obvious that because of the many C=C double bonds in the polyesters at least one or more of these may be reacted. If a low ratio amine to polyester is used only a fraction of the unsaturation is reacted; if a higher ratio is employed more double bonds are reacted. With equivalent amounts substantially all of the C=C double bonds are reacted. The reaction of the amine with the polyester is a mildly exothermic, relatively rapid reaction and generally occurs spontaneously upon mixing. The amount of heat liberated depends on the number of double bonds which are reacted with the amine. The reaction takes place at relatively low temperatures, viz. 20° C. to 150° C. It is preferred to have the reaction take place spontaneously and to proceed at temperatures between 50° C. and 150° C. Under these conditions a possible competitive reaction is minimized, i.e. the ammonolysis of ester linkages to form amides. It is believed that ammonolysis proceeds to only a slight degree, because the addition reaction takes place rapidly and ammonolyses are generally slow.

Because polyesters usually contain free carboxyl groups part of the amine may remain combined in the form of a salt.

The reaction may be carried out without a solvent or if desired a solvent may be used, e.g. dioxane.

The products obtained by the practice of this invention are resinous in nature; they may be tough horn-like materials or soft solids or very viscous liquids according to the choice of reactants. Depending on the amine used they vary from light tan to dark reddish brown in color. They are generally insoluble in water, but may be dissolved or dispersed by the addition of acids. This property indicates that the polyester, originally insoluble in dilute aqueous acid, has been converted to secondary amine derivative. They are soluble in alcoholic solvents such as isopropyl alcohol.

The resinous nature of the products of this invention distinguishes them from the aspartates which are simple derivatives of esters of maleic or fumaric acid. Such low molecular weight, non-complex products are described in U.S. Patents 2,324,712, 2,379,535, 2,438,091 and 2,438,092. Since the products of the present invention are polyesters they are distinct from the aspartic acid compounds described in U.S. Patent 2,200,220 and U.S. Patent 2,761,874. The present products are different in structure and properties from the polyester polyamides which are described in the literature, as for example in U.S. Patent 2,490,001, and U.S. Patent 2,490,002. These are prepared at higher temperatures, contain repeating amide linkages and are not acid soluble.

*Example 1*

A polyester was prepared from ethylene glycol (208 g.) and maleic anhydride (294 g.) by heating the reactants in a carbon dioxide atmosphere and distilling off the water formed in the reaction. A maximum temperature of 227° C. was reached; the product had an acid number of 14.6.

Fifty grams of this polyester was dissolved in 450 g. dioxane. Addition of 22 g. of monoethanolamine brought about a spontaneous reaction which caused the temperature of the solution to rise from 22° C. to a maximum of 39° C. in fifteen minutes. The product remained dissolved in the dioxane.

*Example 2*

A polyester was prepared by reacting ethylene glycol (238 g.) and maleic anhydride (272 g.). The reaction mixture was blanketed with carbon dioxide and heated to a maximum temperature of 238° C. The product had an acid number of 14.3.

1-(2-amino ethyl)-2-heptadecyl imidazoline was prepared by interacting equimolar amounts of diethylene triamine and stearic acid. Thirty grams of the molten amino compound (temp. 70° C.) was added to fifteen grams of this polyester. The reaction was exothermic and formed a red, clear, viscous liquid at 90° C.

The cold resinous product was soluble in Varsol solvent. A clear amber solution was formed with dilute acetic or lactic acid.

*Example 3*

An ethylene glycol maleate polyester was prepared by reacting 377 g. of the glycol and 490 g. maleic anhydride. 1-(2-aminoethyl)-2-(2-ethylpentyl)-imidazoline was prepared from 175 g. diethylene triamine and 245 g. of 2-ethyl hexoic acid. The product of this reaction (345 g.) was mixed at 38° C. with 232 g. polyester. The reaction caused the temperature to rise to 88° C. in seven minutes. After another eighteen minutes the temperature had gone down to 75° C. The mixture was maintained at 50–60° C. for three-quarters of an hour.

The product was a viscous, sticky resinous mass with a dark, red-brown color. It was soluble in dilute acetic, phosphoric or sulfuric acid. It was also soluble in isopropyl alcohol.

*Example 4*

A polyester was made by reacting 548 g. diethylene glycol and 452 g. maleic anhydride. The product, made under $CO_2$ and with a maximum reaction temperature of 220° C., had an acid number of 24.

Two hundred grams of this polyester were mixed with cyclohexylamine (100 g.). The mixture was at 27° C. to start but rose spontaneously to 75° C. in seven minutes. After mix had cooled to 57° C. (this required 19 minutes) it was kept at 60° C. for about two hours to insure complete reaction.

The product was a clear resin with a honey-like viscosity. It was insoluble in water; soluble in dilute hydrochloric acid or dilute acetic acid.

Instead of using 452 g. maleic anhydride in the above example, I may use 600 g. of itaconic acid to produce a polyester which may be reacted with cyclohexylamine by the procedure described above to produce a clear resin insoluble in water and soluble in dilute acids.

*Example 5*

One hundred and fifty grams of a diethylene glycol maleate polyester similar to that used in Example 4 was warmed in a water bath and 270 g. of an imidazoline prepared from stearic acid and diethylene triamine was added. The starting temperature was about 70–75° C., but it rose spontaneously to 95° C. The smooth mixture became homogeneous and was stirred until there was no further evidence of heat evolution. The resinous product was orange-yellow in color; on cooling to room temperature it was a solid which could be indented with the fingernail.

This resin formed a clear, reddish-orange solution in warm isopropyl alcohol. By adding glacial acetic acid to the extent of 6% of the weight of resin, the isopropyl alcohol solution gave a clear solution when diluted with water.

This resinous product is useful as a sizing material for freshly spun glass fibers to impart abrasion resistance throughout spinning and weaving operations.

*Example 6*

Two hundred and fifty grams of polyester (diethylene glycol maleate similar to that used in Example 4) and 250 g. of 1-(2-aminoethyl)-2-(2-ethylpentyl) imidazoline were mixed at 38° C. The temperature rose to 56° C. in eighteen minutes, and was maintained between 55 and 60° C. for one hour.

The product was insoluble in water, soluble in dilute acetic acid or dilute hydrochloric acid.

*Example 7*

A polyester was prepared by reacting dipropylene glycol (302 g.) and maleic anhydride (198 g.) under $CO_2$ with removal of water of esterification. The product had an acid number of 21.6.

Fifteen grams of this polyester was mixed with 24.6 g. of the imidazoline formed from stearic acid and diethylene triamine, and heated to 80° C. The product on cooling was a soft, caramel colored resin. It liquified on heating forming a clear reddish liquid. It is soluble in hot Varsol forming a solution which clouds slightly on standing. It formed a clear solution in dilute formic acid.

*Example 8*

Fifteen grams of the dipropylene glycol maleate used in Example 7 was mixed with 18.7 g. of an imidazoline prepared from lauric acid and diethylene triamine and reacted as in Example 7. The product was soluble in dilute formic acid.

*Example 9*

Fifteen grams of dipropylene glycol maleate like that used in Example 7 was reacted at 60–70° C. with 24.5 g. of the imidazoline obtained from oleic acid and diethylene triamine. The product was a reddish yellow resin, soluble in Varsol or dilute formic acid.

*Example 10*

Equal weights of dipropylene glycol maleate and the imidazoline from 2-ethyl hexoic acid were reacted to form a product which was soluble in dilute formic acid.

*Example 11*

A polyester was prepared by reacting 377 g. of a polyethylene glycol having an average mol weight of 285–315 (sold under the name Carbowax Polyethylene Glycol 300) and 123 g. of maleic anhydride. The polyester was prepared in the presence of a small amount of hydroquinone and had an acid number of 14.5.

This polyester was allowed to react with several imidazolines to obtain reaction products as follows:

(a) With 1-(2-aminoethyl)-2-heptadecenyl imidazoline a dark red very viscous liquid was formed; it was soluble in dilute acetic acid.

(b) With 1-(2-aminoethyl)-2-heptadecyl imidazoline a solid resinous substance was obtained which was soluble in dilute acetic or dilute formic acid.

(c) With 1-(2-aminoethyl)-2-undecyl imidazoline an amber resin was obtained which was soluble in dilute formic acid.

*Example 12*

A polyester was prepared by the interaction of 265 g. of diethylene glycol, 109 g. of maleic anhydride and 163 g. of adipic acid in the presence of 0.02 g. of hydroquinone. The reaction was carried out at 220° C. with an inert gas stream to protect from oxygen and aid in the removal of water of esterification. The product had an acid number of 19.

One hundred grams of this polyester was warmed to 60° C. and 88 grams of the reaction product of stearic acid (obtained commercially as Hystrene S–97) and diethylene triamine at a temperature of 85° C. were added. The mixture reacted without further heating, reaching a temperature of 87° C. When the exothermic reaction subsided the mixture was heated to 120–130° C. whereupon it became a clear amber resin.

The resinous product was cooled to 85° C. and 15 g. of glacial acetic acid added to form the acetate of the resin. After cooling to 75° C., 50 g. of isopropyl alcohol was added to form a viscous solution. This product was soluble in water.

*Example 13*

One hundred and fifty grams of a diethylene glycol maleate polyester similar to that used in Example 4 was warmed to 50–60° C.

Hydroxy stearic acid derived from ricinoleic acid by hydrogenation and sold commercially as Hyfac 442–12 was reacted with a moelcularly equivalent quantity of diethylene triamine until two molecular equivalent amounts of water had been eliminated. Two hundred and seventy grams of this condensation product was warmed to 60° C. and added with stirring to the warm polyester.

The mixture warmed spontaneously to 82° C., tending to form a soft gel. By stirring and heating to 110° C. this gel thinned out forming a clear, reddish amber resin. The mass was cooled, mixed with 250 cc. isopropyl alcohol and 27 g. of glacial acetic acid to form the acetate. The isopropyl alcohol solution of the product readily gave clear solutions on dilution with water.

*Example 14*

A polyester was prepared by heating under the usual conditions a mixture of 312 g. diethylene glycol, 30 g. trimethylol propane, 195 g. maleic anhydride and 0.02 g. hydroquinone.

Eighty-seven grams of the hydroxystearic acid-diethylene triamine condensation product used in Example 13 was warmed to 80° C. and added to fifty-four grams of this triol-modified polyester at 65° C.

Reaction took place exothermically, the temperature rose to 90° C. and a crumbly gel formed. Ten grams of glacial acetic acid was added and the mass stirred and heated up to 100–120° C. for one hour. Part of the gel had liquified so that addition of 60 g. of isopropyl alcohol yielded a solution containing gel particles. The solution was dilutable with water.

*Example 15*

To 150 g. of diethylene glycol maleate, such as that used in Example 4, warmed to 60° C. there was added 135 g. of an imidazoline prepared from stearic acid (Hystrene S–97) and diethylene triamine (temperature 85° C.). The temperature of the stirred mixture rose spontaneously to 95° C. forming a clear, red-amber resinous product.

After the exotherm the mass was heated briefly to 105° C., cooled, treated with 13.5 g. glacial acetic acid and 115 g. isopropyl alcohol. A clear solution was formed which, on cooling and standing, thickened and became hazy. The product was soluble in water.

A comparison of the proportions of reactants used in Example 15 with those used in Example 5 shows that only half as much of the amine is added to the unsaturated polyester. The addition is exothermic and the reaction product is still water soluble. In the other examples given above substantially one mole of amine is reacted with one repeating unit in the polyester, i.e., one amine for each double bond. The result of Example 15, where approximately .48 mole amine is reacted with the polyester, indicates the wide range of ratios of amine to polyester that can be used. Lower ratios, e.g. 0.1 mole amine per repeating unit of polyester, may be used.

The products which are described above and illustrated by the examples just given have properties and structure which make them useful for a number of purposes. Those products which are derived from simple primary amines have a repeating secondary amine structure. The percentage of contained secondary amine groupings may be varied over a wide range. Such compounds have utility in the modification and technology of other resins, e.g. they are suggested as curing agents for epoxy resins.

*Example 16*

A product with more than the usual percentage of secondary amine groupings was prepared by the interaction of an unsaturated polyester with a gamma aminopropyl amine as follows:

Fifty-four grams of diethylene glycol maleate such as that used in Example 4 was warmed to 60° C.

The gamma aminopropyl derivative of an amine obtained from tallow by hydrogenation of the nitrile of the tallow acids (obtained commercially under the name Diam 26) was heated to 50° C. and added to the polyester with stirring.

The mixture became warmer spontaneously; the heat of reaction was sufficient to raise the temperature to 80° C. A clear orange-red resinous liquid was formed which thickened and became hazy on cooling.

Those skilled in industrial technology will understand the usefulness of these new products in such fields as paper, textiles, ceramics, where the surface-active properties of the products may cause changes in strength, hand, viscosity of mixes.

The products may be used in aqueous media or may be used in organic media, as for example in formulations used as corrosion inhibitors, or as additives in lubricating oils, rolling or cutting oils.

Special usefulness has been found for the products containing imidazoline groupings. These products may be applied from aqueous dilute acid solution to freshly drawn glass fibers. They provide a lubricating, protecting size coating which improves the twisting and combining of these fibers into yarn and thread for weaving of glass textile articles.

I claim:

1. A polyester containing at least one secondary amine group obtained by the interaction at a temperature from 20° C. to 150° C. of an unsaturated polyester and a mono primary amine, said amine being reacted chemically by addition across the carbon-carbon double bond of said unsaturated polyester in amount from 0.1 to 1 molar equivalent to the carbon-carbon double bonds in said polyester, said unsaturated polyester comprising the interesterification product of an acid of the formula HOOC·U·COOH where U is a divalent radical selected from the group consisting of

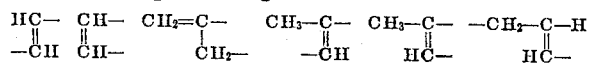

and a glycol of the formula HO—G—OH where G is a divalent radical selected from the group consisting of 1,2-; 1,3-; 1,4-; 1,5-; 1,6-alkylene radicals containing from 2 to 6 carbon atoms and polyoxyethylene and polyoxypropylene radicals containing 1 to 5 oxygen atoms, said mono primary amine having the formula $RNH_2$ wherein R is a monovalent radical selected from the group consisting of aliphatic, aromatic, cycloaliphatic and heterocyclic radicals.

2. An amine modified polyester resin containing the interaction product of a resinous polyester of a glycol and maleic anhydride, and 1-(2-amino ethyl)-2-heptadecyl imidazoline reacted chemically at a temperature of 20° to 150° C. by addition across the carbon-carbon double bond of said resinous polyester in amount from 0.1 to 1 molar equivalent to the carbon-carbon double bonds in said polyester.

3. An amine modified polyester resin containing the interaction product of a resinous polyester of a glycol and maleic anhydride, and cyclohexylamine reacted chemically at a temperature of 20° to 150° C. by addition across the carbon-carbon double bond of said resinous polyester in amount for 0.1 to 1 molar equivalent to the carbon-carbon double bonds in said polyester.

4. An amine modified polyester resin containing the interaction product of a polyester resin obtained by reacting a glycol and maleic anhydride, and a condensation product of stearic acid and diethylene triamine said condensation product having reacted chemically at a temperature of 20° to 150° C. by addition across the carbon-carbon double bond of said polyester resin in amount from 0.1 to 1 molar equivalent to the carbon-carbon double bonds in said polyester resin.

5. An amine modified polyester resin containing the interaction product of a polyester resin obtained by reacting a glycol and maleic anhydride, and a condensation product of oleic acid and diethylene triamine said condensation product having reacted chemically at a temperature of 20° to 150° C. by addition across the carbon-carbon double bond of said polyester resin in amount from 0.1 to 1 molar equivalent to the carbon-carbon double bonds in said polyester resin.

6. An amine modified polyester resin containing the interaction product of a polyester resin obtained by reacting a glycol and maleic anhydride, and a condensation product of lauric acid and diethylene triamine said condensation product having reacted chemically at a temperature of 20° to 150° C. by addition across the carbon-carbon double bond of said polyester resin in amount from 0.1 to 1 molar equivalent to the carbon-carbon double bonds in said polyester resin.

References Cited in the file of this patent

UNITED STATES PATENTS

| | | |
|---|---|---|
| 2,048,778 | Brubaker et al. | July 28, 1936 |
| 2,333,639 | Christ | Nov. 9, 1943 |
| 2,363,581 | Frosch | Nov. 28, 1944 |
| 2,378,230 | Little | June 12, 1945 |
| 2,475,409 | Smith et al. | July 5, 1949 |
| 2,482,515 | Sattler | Sept. 20, 1949 |
| 2,646,416 | Parker | July 27, 1953 |
| 2,706,191 | Holmen | Apr. 12, 1955 |